United States Patent
Tian

(10) Patent No.: US 11,428,570 B2
(45) Date of Patent: Aug. 30, 2022

(54) AERIAL FIBER OPTIC CABLE LOCALIZATION BY DISTRIBUTED ACOUSTIC SENSING

(71) Applicant: NEC Laboratories America, Inc., Princeton, NJ (US)

(72) Inventor: Yue Tian, Princeton, NJ (US)

(73) Assignee: NEC Corporation

( * ) Notice: Subject to any disclaimer, the term of this patent is extended or adjusted under 35 U.S.C. 154(b) by 178 days.

(21) Appl. No.: 16/838,105

(22) Filed: Apr. 2, 2020

(65) Prior Publication Data

US 2020/0319017 A1 Oct. 8, 2020

(51) Int. Cl.
*G01H 9/00* (2006.01)
*G02B 6/44* (2006.01)

(52) U.S. Cl.
CPC ........... *G01H 9/004* (2013.01); *G02B 6/4422* (2013.01)

(58) Field of Classification Search
None
See application file for complete search history.

(56) References Cited

U.S. PATENT DOCUMENTS 5,023,399 A * 6/1991 Mills .................... G02B 6/4471 174/127
5,513,292 A * 4/1996 Rowland ............... G02B 6/4417 385/100
5,563,971 A * 10/1996 Abendschein ....... G02B 6/3825 385/71

FOREIGN PATENT DOCUMENTS

WO 2008057810 A2 5/2008

OTHER PUBLICATIONS

BANDWEAVER, Distributed Acoustic Sensing (DAS) technology employed to tackle overhead power line theft, case study of BNADWEAVER, Aug. 22, 2018 [retrieved on Aug. 22, 2020], Retrieved from <BANDWEAVER, https://www.bandweaver.com/wp-content/uploads/2018/08/Edesur-power-line-theft-prevention-case-study-v1.0.2.pdf> pp. 1-3.

* cited by examiner

*Primary Examiner* — Lisa M Caputo
*Assistant Examiner* — Nigel H Plumb
(74) *Attorney, Agent, or Firm* — Joseph Kolodka

(57) ABSTRACT

Aspects of the present disclosure describe aerial fiber optical cable localization using distributed acoustic sensing (DAS) that advantageously may determine the locality of electrical transformers affixed to utility poles along with the aerial fiber optical cable as well as any length(s) of fiber optical cable between the poles. Further aspects employ survey manned or unmanned, aerial or terrestrial survey vehicles that acoustically excite locations along the fiber optical cable and associate those DAS excitations with global positioning location (GPS).

10 Claims, 4 Drawing Sheets

AERIAL FIBER OPTIC CABLE LOCALIZATION BY DISTRIBUTED ACOUSTIC SENSING

TECHNICAL FIELD

This disclosure relates generally to optical communications and optical sensing systems, methods and structures. More particularly, it describes the determination of aerial cable localization using distributed sensing.

BACKGROUND

As is known aerial fiber optic cables are used to provide data communications services to both residential and commercial sites. And while aerial cables are usually attached to utility poles and exhibit a fixed route, it is nevertheless difficult for telecommunications carriers and service providers to estimate or otherwise determine aerial cable length distributions on a geographic map solely based on pole-to-pole distance(s) and poles' geographic locations—due in part to extra cable loops/coils deployed in the aerial configurations for possible future drop points, branches, and general redundancy.

SUMMARY

An advance in the art is made according to aspects of the present disclosure directed to aerial cable localization using distributed acoustic sensing (DAS) technology.

In sharp contrast to the prior art, systems, methods, and structures according to aspects of the present disclosure advantageously achieve aerial fiber optical cable localization using distributed acoustic sensing (DAS) that advantageously determines the locality of electrical transformers affixed to utility poles along with the aerial fiber optical cable as well as any length(s) of fiber optical cable between the poles. Further aspects employ survey manned or unmanned, aerial or terrestrial survey vehicles that acoustically excite locations along the fiber optical cable and associate those DAS excitations with global positioning location (GPS).

BRIEF DESCRIPTION OF THE DRAWING

A more complete understanding of the present disclosure may be realized by reference to the accompanying drawing in which.

Figure 1:
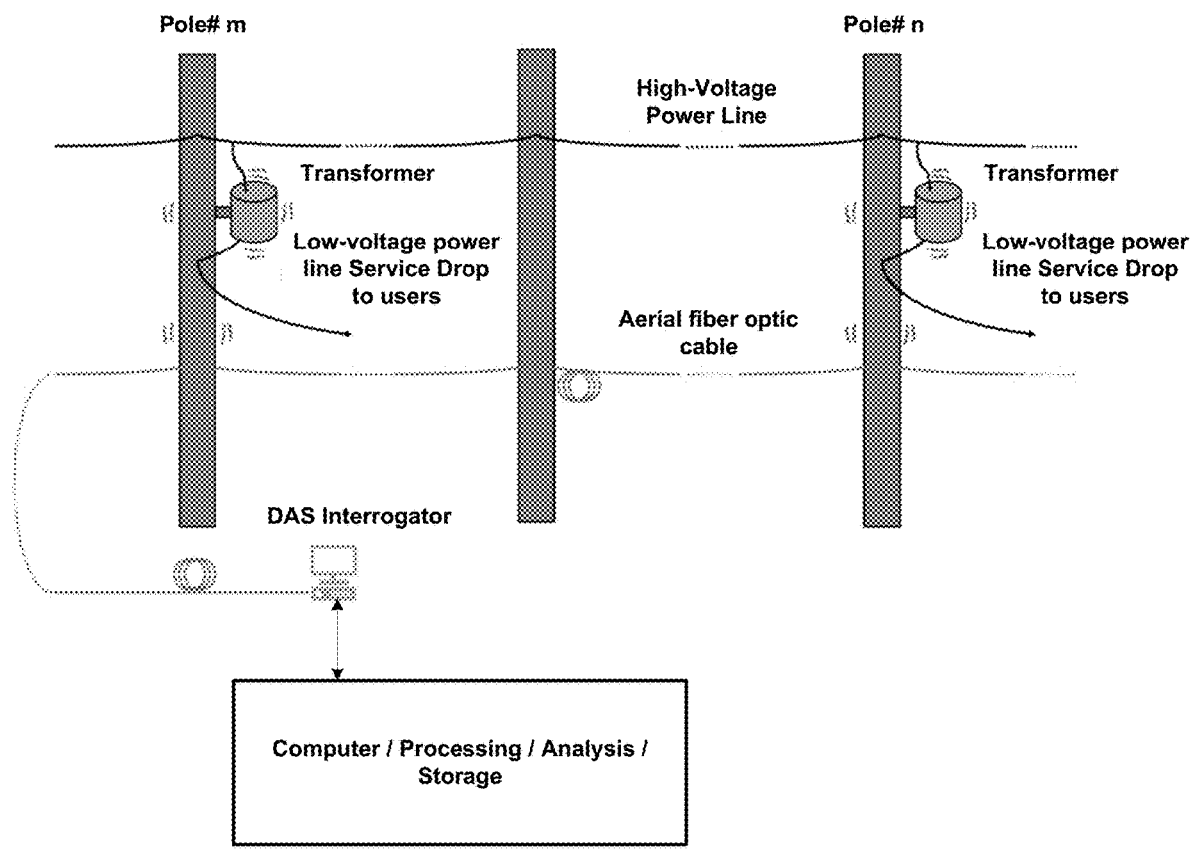
FIG. 1 shows a schematic diagram of an illustrative aerial fiber optic cable arrangement on utility poles along with high-voltage power line(s) and distributed acoustic sensing (DAS) interrogator according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

We begin by noting once more that systems, methods, and structures according to aspects of the present disclosure advantageously and inventively employ distributed acoustic sensing (DAS) to measure/determine locations with specific acoustic excitations along an aerial fiber optic cable. Generally, by associating the measured locations along the aerial cable and the geographic locations of those acoustic excitations, the aerial cable route and length distribution may then be geographically mapped. As used herein, the "location along the aerial cable" is the aerial cable length between a location under test and a DAS interrogator connected to and communicating with the aerial cable.

FIG. 1 shows a schematic diagram of an illustrative aerial fiber optic cable arrangement supported on utility poles along with high-voltage power line(s) and distributed acoustic sensing (DAS) interrogator according to aspects of the present disclosure;

As may be observed from that figure, high-voltage power lines are shown as supported on utility poles—a column or post used to support overhead (aerial) power lines and various other public utilities such as electrical cable, fiber optic cable, and related equipment such as transformers and street lights. A utility pole may be referred to as a transmission pose, telephone pole, telecommunication pole, power pole, hydro pole, telegraph pole, or telegraph post, depending upon its application and particular language dialect in an area in which it is installed.

Shown further in that figure are transformers that convert a relatively high-voltage to a lower-voltage for the purposes of electrical power distribution. The transformers—while shown as bring mounted or suspended on the utility poles, may sometimes be installed nearby on the ground, with connecting power cables dropped from the poles to the transformer(s).

As those skilled in the art will appreciate, due to magnetostriction effect(s), the transformers intrinsically vibrate and generate mechanical disturbances (i.e., sounds/noise) at specific frequencies. Such sounds/noise/vibrations may be transmitted—via the utility pole and/or connecting cable—to the aerial cable attached to the pole(s).

Note that a fundamental frequency of the noise from the transformer is substantially twice that of the alternating current (AC) frequency, i.e., 12 Hz noise for 60 Hz AC power, or 100 Hz noise for 50 Hz AC power. Therefore, by detecting the peak locations of the transformer vibration frequencies (e.g., 120 Hz or 100 Hz) along the aerial cable, the poles supporting (hosting) both the transformer and the aerial cable can be located along the aerial cable. Combining the geophysical location information of these poles and the aerial cable lengths measured between these poles, the aerial cable route and length distribution may be geographically mapped.

Advantageously, our inventive methodology may be applied to existing power/pole/telecommunications/optical fiber cable installations to provide such functionality. Operationally, the overall methodology may be described by:

1. Providing a distributed acoustic sensing (DAS) interrogator and coupling same to an existing aerial fiber optic cable;
2. Using DAS, continuously monitor an acoustic signal along the entire aerial fiber optic cable;
3. Using a real-time bandpass filter centered at 120 Hz (or 100 Hz if AC frequency is 50 HZ), continuously filter the DAS signal other than 120 Hz;
4. From the filtered DAS signal, determine constantly present signal peaks and their representative location(s) along the aerial cable measured by DAS.
5. Determine, from the constantly present signal peaks and their representative locations, the geophysical locations of the poles with transformers.

We note that with respect to the above methodology, it may be observed that as shown in FIG. 1, pole m and pole n have transformers suspended therefrom. As such, DAS can detect two peaks along the aerial optical cable, one each corresponding to the individual transformers. One peak—generated by transformer on pole m—is illustratively located at x meters from DAS interrogator. The other peak—generated by transformer on pole n—is illustratively located at y meters away from the DAS interrogator. Since these peaks are excited/produced by the poles with transformers, the geophysical locations of these poles with transformers are the geophysical locations of the peaks along the length of aerial cable. By matching the geophysical locations of these poles suspending the transformers responsible for producing these peaks with the peak locations along the aerial cable, the aerial cable length(s) between these poles are obtained. For example, in FIG. 1, the aerial cable length between pole m and pole n is (y-x) meters.

Accordingly, the aerial cable route and length distribution between these poles with transformers may be geographically mapped. Those skilled in the art will of course appreciate that the above method is performed on a digital computer, that may be programmed to control the DAS operation, receive, and filter the returned DAS signals, store geolocations of the poles and determine any associations between the returned DAS signals and the geolocations of those poles as well as determine length(s) of fiber between the poles.

Figure 2:
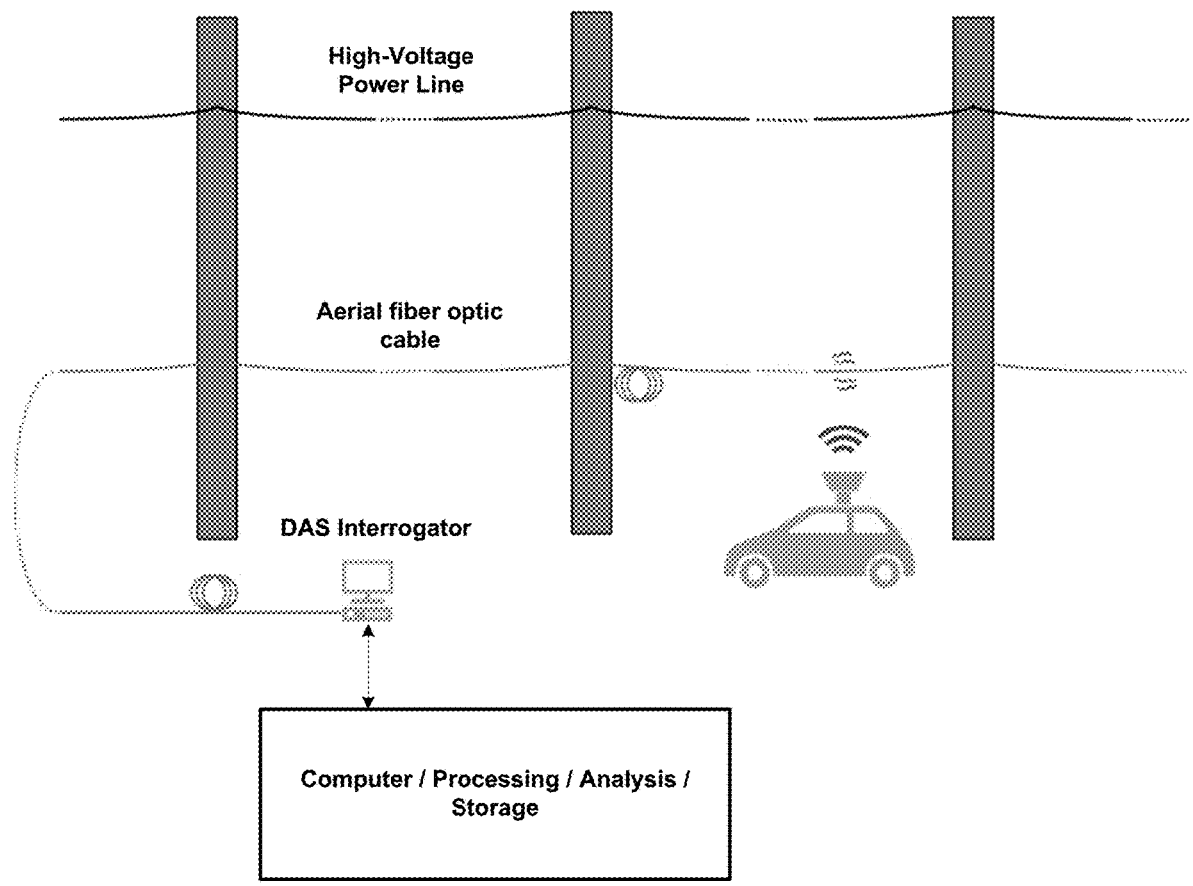
FIG. 2 shows a schematic diagram of an illustrative aerial fiber optical cable arrangement on utility poles along with high-voltage power line(s) and distributed acoustic sensing (DAS) interrogator being stimulated by a mobile stimulator according to aspects of the present disclosure.
Figure 3:
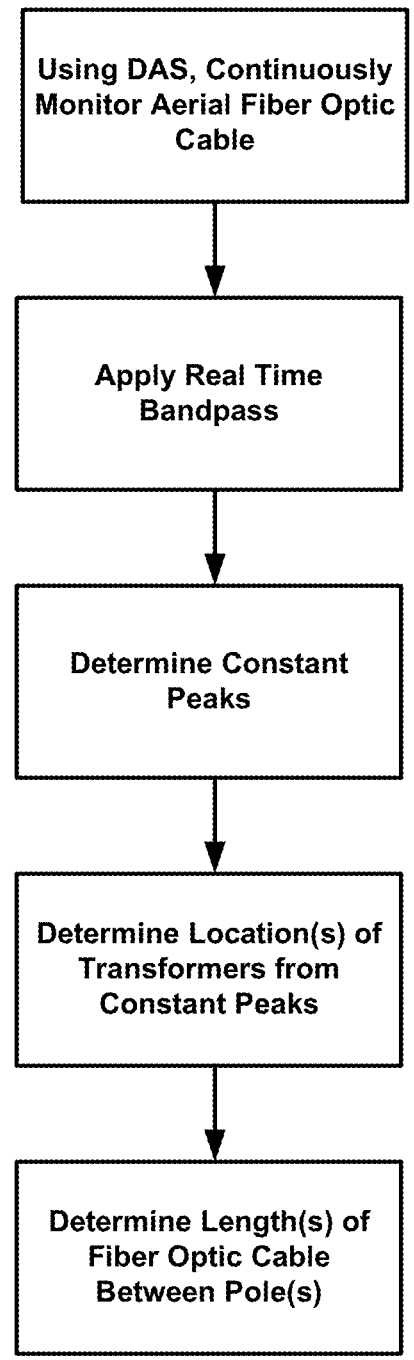
FIG. 3 is a flow diagram illustrating overall process/method according to aspects of the present disclosure.
Figure 4:
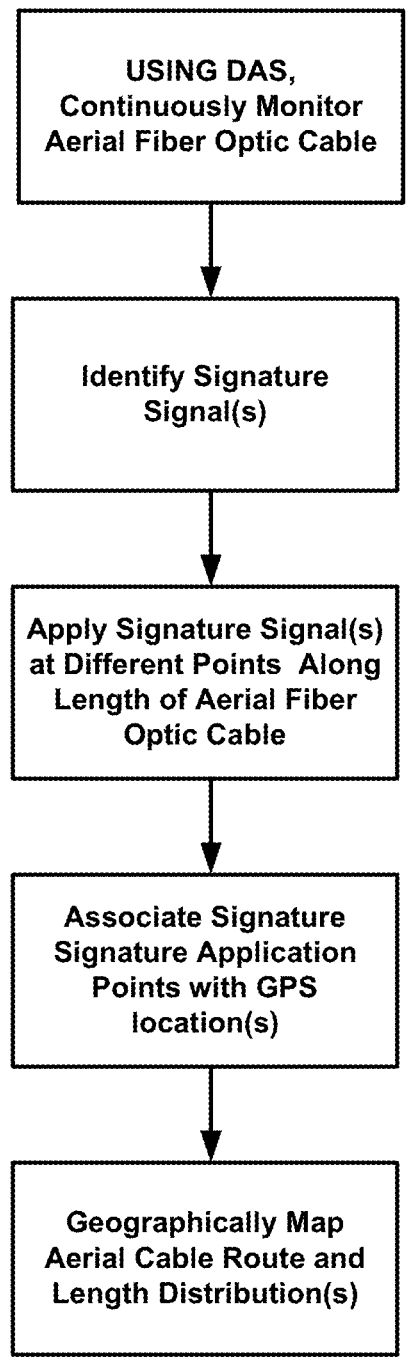
FIG. 4 is a flow diagram illustrating an additional process/method according to aspects of the present disclosure.

Advantageously, we now disclose another method according to aspects of the present disclosure whereby we employ a survey vehicle—manned or unmanned—aerial (drone) or terrestrial (automobile)—equipped with an acoustic signal generator e.g., a speaker, as an acoustic excitation source. The operation setup and principles are schematically illustrated in FIG. 2.

Operationally, a survey vehicle with acoustic signal generator (e.g. speaker) and GPS logger is used as a moving acoustic excitation source. Note that while the survey vehicle is shown as a terrestrial/ground vehicle (automobile), it may also be performed by aerial drone. Either type of survey vehicle may advantageously be manned or unmanned. Additionally, should a survey route run along a railway, a railway vehicle may likewise be employed as survey vehicle.

During operation, when the survey vehicle is proximate/ sufficiently close to the aerial cable, the generated acoustic signal can be picked up by the aerial cable through air and detected by DAS. The location of this acoustic signal along the aerial cable, i.e. the aerial cable length from this acoustic signal to DAS interrogator, is sufficiently close to the GPS location, i.e. geographic location, of the survey vehicle. If the survey vehicle moves along the aerial cable route with constant acoustic signal excitation, the DAS can sense the acoustic signal location moving along the aerial cable as well. By matching the moving location of acoustic signal along the aerial cable and the moving GPS locations of the survey vehicle, the aerial cable route and length distribution can be geographically mapped.

Operationally, the overall procedure and implementation may proceed as follows:

1. Connect DAS interrogator to the aerial fiber optic cable.
2. Using DAS, continuously monitor the acoustic signal along the whole aerial fiber optic cable;
3. Find one frequency (or multiple frequencies) not constantly present in the DAS signal along the aerial fiber optic cable. Use this frequency as signature signal for acoustic excitation by the survey vehicle. Alternatively, a combination of multiple frequencies may be used as a signature signal.
4. Constantly generate the signature signal by operating the acoustic generator (e.g. speaker) on the survey vehicle while simultaneously logging a GPS location of the vehicle. Use DAS to constantly track the location of the signature signal along the aerial cable, by frequency filtering and pattern matching.
5. Drive/relocate the survey vehicle along the aerial cable route, sufficiently near the aerial cable route, so the aerial cable can be excited (picked up) by the acoustic signature signal propagating through air.
6. Match the moving signature signal location along the aerial cable and the GPS location of the survey vehicle in time domain for the aerial cabled route of interest.
7. Since the survey vehicle may not be able to move directly under or above the aerial cable, its GPS location may include distance error(s) relative to the actual geographic location of the aerial cable. To minimize this error, the GPS route of the aerial cable can be corrected by referring to the geographic route of the utility poles, since the aerial cable is supported by these poles and its route is limited and connected by these poles.
8. As a result, the aerial cable route and length distribution can be geographically mapped accurately.

While we have presented this disclosure using some specific examples, those skilled in the art will recognize that our teachings are not so limited. Accordingly, this disclosure should be only limited by the scope of the claims attached hereto.

The invention claimed is:

1. A method of localizing aerial fiber optical cable comprising:

continuously monitor the entirety of an aerial fiber optical cable using distributed acoustic sensing (DAS);

apply a real time bandpass filter to returned DAS signals at a particular transformer vibration frequency, and continuously filter the returned DAS signals other than at the particular transformer vibration frequency;

determine constantly present peaks and representative locations of the constantly present peaks exhibited in the returned, filtered DAS signals;

determine locations of one or more electrical transformers situated on poles suspending the aerial fiber optical cable based on the determined constantly present peaks and the representative locations of the constantly present peaks.

2. The method of claim 1 further comprising:

determining lengths of the aerial fiber optical cable between the poles.

3. The method of claim 1 wherein the determined locations of the electrical transformers are geophysical locations.

4. The method of claim 1 wherein the electrical transformers acoustically excite the fiber optical cable and the returned DAS signals are indicative of the acoustical excitation.

5. The method of claim 4 wherein the bandpass filter is one selected from the group consisting of 60 Hz bandpass filter and 50 Hz bandpass filter.

6. A method of localizing aerial fiber optical cable comprising:

continuously monitor the entirety of an aerial fiber optical cable using distributed acoustic sensing (DAS);

determining a frequency not constantly present in the DAS signal along the aerial fiber optic cable for use for acoustic excitation by a survey vehicle;

continuously apply the frequency as a signature signal at different points along a length of aerial fiber optical cable while determining a GPS geolocation of that application using an acoustic generator;

move the survey vehicle along a route of the aerial fiber optic cable to excite the aerial cable by the signature signal propagating through air;

associate the application of the signature signal at the different points with the determined GPS geolocation of the points;

geographically map an aerial fiber optical cable map route and length distribution from associated signature signals and geolocation of the points.

7. The method of claim 6 wherein the signature signal is determined by:

determining one or more additional frequencies not constantly present in the DAS signal along the aerial fiber optic cable; and employing one or more of the determined frequencies as the signature signal.

8. The method of claim 7 wherein the signature signal is generated by an acoustic signal generator, said acoustic signal generator physically moved along the length of the aerial fiber optical cable.

9. The method of claim 8 wherein the acoustic signal generator is affixed to the survey vehicle selected from the group consisting of terrestrial vehicle, and aerial vehicle.

10. The method of claim 9 wherein the survey vehicle is one selected from the group consisting of manned survey vehicle and unmanned survey vehicle.

* * * * *